United States Patent [19]
Shafer

[11] 3,917,793
[45] Nov. 4, 1975

[54] PROCESS FOR THE PRODUCTION OF SENARMONTITE BY CONTROLLED HYDROLYSIS OF ANTIMONY TRICHLORIDE

[75] Inventor: John L. Shafer, Pomona, Calif.

[73] Assignee: Occidental Petroleum Corporation, Los Angeles, Calif.

[22] Filed: Mar. 2, 1973

[21] Appl. No.: 337,542

[52] U.S. Cl................................. 423/617; 106/303
[51] Int. Cl.².................. C01B 27/00; C01B 29/00; C01G 29/00
[58] Field of Search............... 423/87, 617; 106/303

[56] References Cited
UNITED STATES PATENTS
2,350,638   6/1944   Podschus et al.................... 423/617
3,676,362   7/1972   Yates................................... 423/87

FOREIGN PATENTS OR APPLICATIONS
748,997   1944   Germany.............................. 423/87

OTHER PUBLICATIONS
Chemical Abstracts, Vol. 68, p. 4419, No. 45671g, 1968.

Primary Examiner—Oscar R. Vertiz
Assistant Examiner—Eugene T. Wheelock
Attorney, Agent, or Firm—Christie, Parker & Hale

[57] ABSTRACT

Antimony trichloride contained in an aqueous chloride solution is hydrolyzed to light stable senarmontite by contact with a base and water at a temperature below 40°C, the hydrolysis being carried out at a pH of from 7 to 10.

29 Claims, 1 Drawing Figure

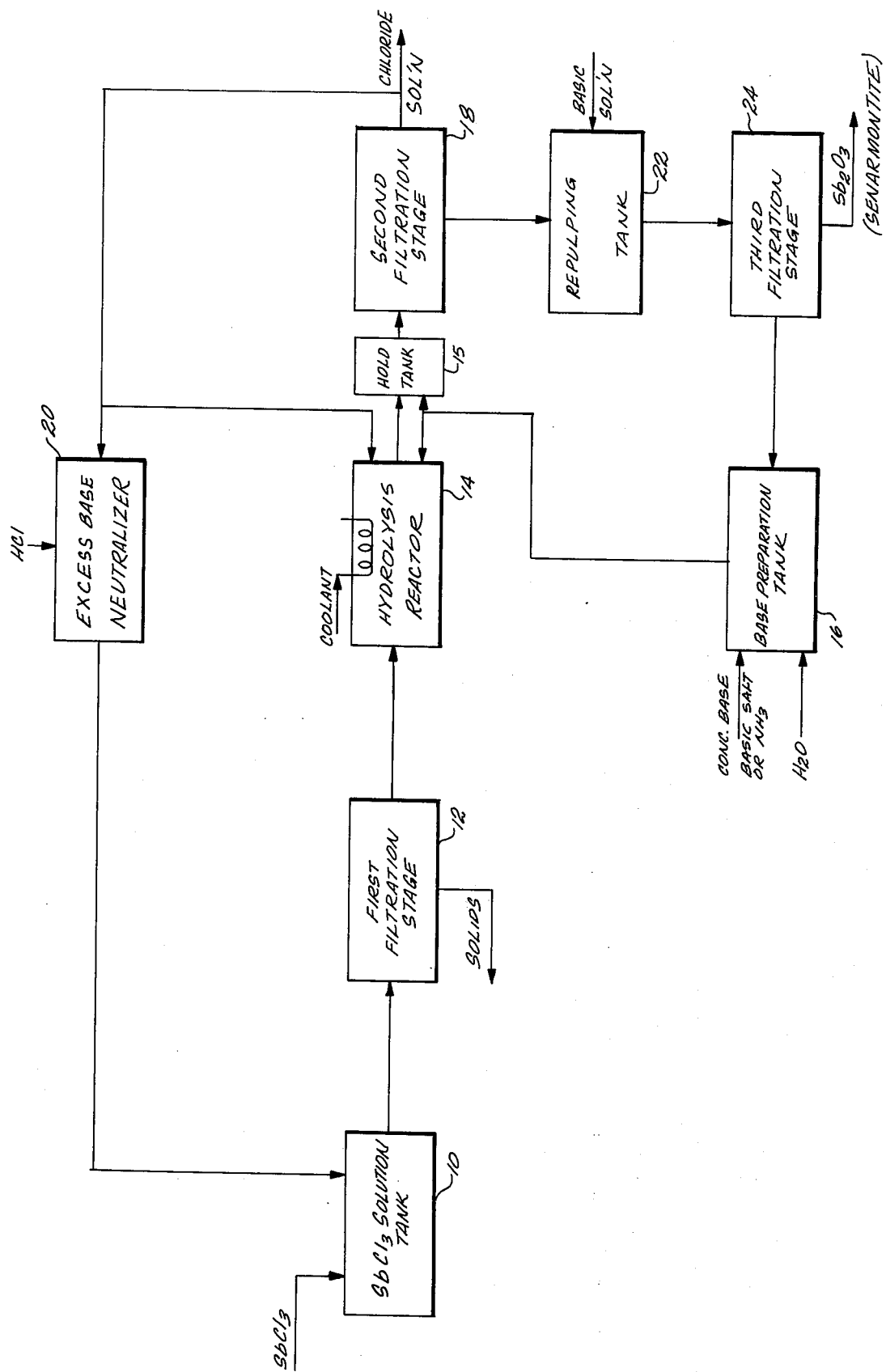

PROCESS FOR THE PRODUCTION OF SENARMONTITE BY CONTROLLED HYDROLYSIS OF ANTIMONY TRICHLORIDE

BACKGROUND OF THE INVENTION

The light stable forms of antimonous oxide are used in the manufacture of paints or plastic, ceramic ware and the like because of the extreme whiteness of the material and its stability against darkening in the presence of light.

Antimonous oxide exists in two crystal states, one is cubic (senarmontite) and the other orthorombic (valentinite).

While naturally occurring valentinite is light insensitive, antimonous oxide in the valentinite state formed by the hydrolysis of solid antimony trichloride in an aqueous ammonia solution has heretofore resulted in a product which is light sensitive and will darken upon exposure to light.

Light sensitivity of synthetically produced valentinite has been attributed to absorbed water and the product has been converted to a light insensitive material when heated under vacuum at a temperature of at least about 250°C.

SUMMARY OF THE INVENTION

The present invention pertains to the production of high purity, light stable cubic antimonous oxide or senarmontite from antimony trichloride.

Senarmontite is formed by fully hydrolyzing antimony trichloride at a temperature below about 40°C by reaction with a base and water in an aqueous chloride solution, the base being present in excess of that required for the hydrolysis of antimony trichloride and at a pH of from about 7 to about 10.

Preferably, the chloride concentration is in excess of 1 molar and where ammonium chloride is used, a concentration of from about 1 to about 5.5 molar, preferably about 3 to about 5 molar. The hydrolysis is carried out for a time sufficient for the antimony trichloride to hydrolyze to solid senarmontite which is then recovered from the hydrolysis solution.

To minimize the amount of base required, the reaction is preferably carried out at a pH from 8 to about 9.

The lower temperature limit at which hydrolysis is carried out is the freezing point of the solution which, for an ammonium chloride solution, when saturated, is about −15°C.

Preferably, however, hydrolysis is carried out at a temperature from about 0° to about 25°C.

The solid senarmontite which is recovered as a consequence of the hydrolysis reaction is normally washed in water or a basic solution having a pH less than 11 to remove any excess chloride present. A basic solution is preferred as it will also remove any last traces of antimony oxychlorides which may be present. The basic solution can be recycled as such or with further concentration back to the hydrolysis system.

For the purpose of hydrolysis, the antimony trichloride can be added as a solid, a melt or as an aqueous solution in water alone or with the addition of hydrochloric acid and/or an alkali, alkali earth or ammonium chloride salt. The antimony trichloride may also be added in a partial hydrolyzed state either in solution or as recovered from the solution. When partially hydrolyzed, antimony trichloride exists in the oxychloride state but this does not impede its complete hydrolysis to senarmontite. Preferably, however, the antimony trichloride is added to an aqueous chloride solution which is neutral. This is because antimony chloride dissolved in a neutral aqueous chloride solution is extremely stable for long periods of time.

THE DRAWING

The attached is a schematic illustration of one method of carrying out the process of this invention.

DESCRIPTION

According to the present invention, there is provided a process for the production of light stable cubic antimonous oxide (senarmontite) by the hydrolysis of antimony trichloride in accordance with reactions, such as:

$$2\ SbCl_3 + 6NH_3 + 3H_2O \rightarrow 6NH_4Cl + 2\ Sb_2O_3$$

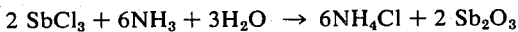
(1)

Hydrolysis of antimony trichloride to senarmontite is carried out in accordance with the practice of this invention by contacting an aqueous chloride solution containing a base with antimony trichloride at a temperature from the freezing point of the chloride solution to about 40°C and at a pH maintained by the addition of excess base, preferably an aqueous basic solution, of from about 7 to about 10, more preferably a pH of from about 8 to about 9, for a time sufficient for the antimony trichloride to hydrolyze to the light stable form of antimonous oxide, namely, senarmontite.

As used herein, an aqueous chloride solution is meant a solution containing free chloride ions as by the addition of a chloride salt such as an alkali, alkaline earth or ammonium chloride, as well as a chloride solution formed as a consequence of total or partial hydrolysis of antimony trichloride.

By a base, there is meant an alkali, alkaline earth metal or ammonium base as well as mixtures thereof. Preferably, the cation of the base employed is the same as the cation of the chloride salt employed.

It is further meant that by the term "antimony trichloride" there is meant antimony trichloride provided as such as a solid melt, in solution, or partially hydrolyzed in solution as well as oxychlorides of antimony recovered from solution.

In carrying out the process of this invention, it is preferred to use an ammonium based system where the concentration of chloride in the solution in which hydrolysis is carried out is from about 1 to about 5.5 molar, preferably from about 3 to about 5 molar.

Antimony trichloride may be introduced for hydrolysis either as solid or molten antimony trichloride (mp. 73.4°C) or an aqueous solution of antimony trichloride in water alone or as solution maintained by the addition of hydrochloric acid and/or an alkali, alkaline earth metal or an ammonium chloride salt. Preferably, however, it is introduced as a solution of antimony trichloride in an aqueous chloride solution which is below a pH of about 7 as represented by the absence of free base. This latter solution has long term stability and hydrolysis will not occur. This permits the solution to be made up in large quantities without the formation of precipitate with standing.

Reaction is carried out, as indicated, at a pH of about 7 to about 10. To maintain the system at this pH requires addition of a base in excess of that required for the hydrolysis of antimony trichloride to antimonous oxide. The amount of excess base being required being a direct function of the pH at which hydrolysis is to be carried out. While temperature dependent, the mean residence time to achieve hydrolysis will, in general, range from about 10 to about 30 minutes to yield senarmontite, with other controlling factors, such as chloride concentration and solution pH generally influencing residence time.

The most important process variables which control whether or not senarmontite is formed or whether valentinite or the oxychlorides of antimony are formed or retained are temperature, pH and chloride ion concentration.

In general, at a pH above about 10, valentinite will begin to form. Also, valentinite will begin to appear at a pH of about 8 when the hydrolysis temperature is above about 40°C. Above this temperature, the product will contain some valentinite and therefore be photosensitive because of the valentinite present. On the other hand, at high concentrations of chloride ion, low temperatures and a pH of less than about 7, hydrolysis of antimony trichloride is incomplete and the various oxychlorides of antimony are formed or retained.

Accordingly, the boundary at which valentinite will form is high reaction temperatures, low chloride ion concentration and high pH. Whereas, for the formation of the various oxychlorides of antimony, the boundary is low temperature, low pH and high chloride ion concentration.

Since senarmontite is formed, in accordance with the practice of this invention, in a solution of high chloride concentration to effectively reduce the chloride retained by the final product, the antimonous oxide precipitate is repulped in water or basic solution at a pH below 11, with the use of a basic solution being preferred to remove any possible traces of the oxychlorides of antimony which may be present. The basic filtrate from this operation and any wash water can be used as make-up for the hydrolysis reaction alone or with addition of concentrate base, basic salt or ammonia.

While no wise limiting, the attached drawing illustrates the preferred procedure for carrying out the process of this invention. With reference thereto, antimony trichloride in the solid or molten state (melting point 73.4°C) is added to the antimony trichloride solution tank 10, preferably agitated. The solution tank 10 may contain water alone as water will dissolve antimony trichloride in a ratio of 8–9:1 of antimony trichloride to water at ambient temperature and yield a clear solution. The solution must be processed within a fairly short period of time for, with standing, a precipitate tends to form. Solution of antimony trichloride in water can be further facilitated by the addition of hydrochloric acid and/or an alkali metal, alkali earth metal, or ammonium chloride salt.

More preferably, however, a solution of chloride salt is employed as a chloride solution containing antimony trichloride is stable for long periods of time in the absence of free base. This permits the use of a large storage tank as solution tank 10.

Independent of the manner in which the solution is formed, the solution from the antimony trichloride solution tank 10 is then passed to a first filtration stage 12 to remove any solids which may be present. Sulfur, for instance, is a possible impurity in an antimony trichloride feed to solution tank 10. Sulfur, along with many other impurities, which are soluble in antimony trichloride lose their solubility in the presence of water and are removed in first filtration stage 12.

The filtered antimony trichloride solution is then passed to a hydrolysis reaction zone which may consist of hydrolysis reactor 14 and, if desired, holding tank 15, again preferably agitated, and maintained at a temperature below about 40°C and above the freezing period of the contained chloride solution. This solution may be present either as a heel for start-up or formed during the hydrolysis of antimony trichloride.

In the hydrolysis zone, hydrolysis may be carried solely in hydrolysis reactor 14. In the alternative, it may be initiated in hydrolysis reactor 14 and allowed to go to completion in hold tank 15. In that instance, to maintain pH at the desired level, a portion of the basic solution from base preparation tank 16 may be fed to hold tank 15. In this embodiment, total residence time for hydrolysis includes the total time in hydrolysis reactor 14 or hydrolysis reactor 14 and hold tank 15.

The base required for the hydrolysis reaction may already be present in instance of the use of ammonia in hydrolysis reactor 14 or added continuously with the addition of antimony trichloride or, as preferred, an antimony trichloride solution.

Conveniently, the base required for the hydrolysis reaction zone may be prepared by the addition of water and a concentrated base, a basic salt, or ammonia gas to base preparation tank 16 for introduction to hydrolysis reactor 14 and, if desired, to hold tank 15. Also, a portion of the aqueous chloride solution from a second filtration stage 18 may be introduced to hydrolysis reactor 14.

Where the solution from filtration stage 24 is too weak for recycle to the hydrolysis zone because of the nature of the cation present, it may be strengthened in base preparation tank 16 by the addition of a concentrated base, a basic salt, or ammonia.

There is formed in the hydrolysis zone, as a consequence of the hydrolysis reaction, a cubic antimonous oxide precipitate and, when agitated, a slurry, the particle size of the particulate cubic antimonous oxide being in the range of about 1–10 microns.

The precipitate or slurry is passed with or without thickening through a second filtration stage 18 where an antimonous oxide wet cake is formed. The filtrate from the second filtration stage 18 may be discarded or recycled back to the system. A portion is passed to excess base neutralizer 20 where the free base present is neutralized by addition of hydrochloric acid to form a neutral chloride solution for feed to the antimony trichloride solution tank 10 to become the dissolving media for antimony trichloride and the balance recycled back to hydrolysis reactor 14.

Since the antimonous oxide is formed in a solution of high chloride concentration, to effectively reduce the chloride entrained in the end product, the wet cake formed in the second filtration stage 18 is passed to repulping tank 22 where base at a pH below about 11 and/or water are added to neutralize or remove the excess chloride. Although the antimony trichloride is essentially completely hydrolyzed to antimonous oxide before filtering, some traces of the oxychlorides of antimony may be present in the wet cake and it is, therefore, preferred to employ a basic solution which contains sufficient base to remove both the chloride and the oxychlorides of antimony such that the resulting solution is neutral or basic after the repulping operation. With this object, the solution could be highly concentrated, where ammonia is used, as an ammonia solution as the filtrate from the third filtration stage 24 can be sent to base solution tank 16 for recycle back to the hydrolysis reaction zone.

In carrying out the process of the invention, the mean residence time in the hydrolysis zone to completely hydrolyze antimony trichloride to senarmontite is dependent upon temperature, pH and chloride ion concentration. In general, at low temperatures and pH and high chloride ion concentrations, longer residence times are required either in the hydrolysis reactor 14 or in an adjacent agitated holding tank 15 which follows the hydrolysis reactor and where the slurry is allowed to warm up before the filtering and washing operations are carried out. The only control required is that if hold tank 15 is employed, the temperature should be maintained below that which valentinite will form until hydrolysis is complete. It may also be necessary to add a base for pH control. For most situations, the mean residence time in the hydrolysis reaction zone is from about 10 to about 30 minutes in order to produce high purity antimonous oxide in the senarmontite state.

While the production of photostable senarmontite in accordance with the practice of the invention may be done on a continuous or a batch-wise basis, a continuous process is favored as it has been found that higher slurry densities of cubic antimonous oxide can be produced as opposed to a batch operation.

Although it has been shown that antimony trichloride is added to solution tank 10 for dissolving antimony trichloride prior to feed to hydrolysis reactor 14, first it may, when desired, be added directly to the hydrolysis reactor as a solid but, preferably, as a melt, provided sufficient cooling is available to always maintain the hydrolysis reactor at a temperature below that at which valentinite will form.

As an incident to the practice of this invention, the hydrolysis process is also effective as a means for the purification of antimony with respect to arsenic, a most troublesome contaminant, so long as cations which form insoluble arsenous salts are absent. This is because arsenous oxide is much more soluble in water or a water ammonium chloride solution than antimonous oxide, arsenic having a reported solubility of about 22.6 grams per liter whereas antimonous oxide has a solubility of only about 0.0083 grams per liter. It will be appreciated therefore that during the second filtration stage following hydrolysis, any arsenic which is present can be allowed to remain in solution and separated from the formed antimonous oxide. This may, however, require, depending on arsenic concentration, discarding all or a portion of the solution formed during this second filtration stage.

EXAMPLE 1

An aqueous solution of antimony trichloride was prepared by the addition of 2.19 parts by weight water to 25 parts by weight pure molten antimony trichloride. The weight ratio of antimony trichloride to water was 8.76:1. The aqueous antimony trichloride solution along with a 5.65 M solution of ammonia was continuously added to a hydrolysis reactor at a rate sufficient to produce a slurry of antimonous oxide at a rate of 4 parts by weight per minute. The hydrolysis reactor contained a heel of 200 parts by weight of an aqueous ammonium chloride solution in which the $NH_4Cl$ content was 21% by weight and $NH_3$ content was 0.4% by weight. This heel provided a chloride concentration of 4.15 molar which approximated the composition of the ammonium chloride solution produced during hydrolysis.

During the hydrolysis reaction, the pH of the mixture was maintained at about 8.3 by adjusting the flow rate of the ammonia solution to the hydrolysis reactor. At the flow rate provided, the amount of ammonia introduced was approximately 7% in excess of stoichiometric amount of ammonia required for the hydrolysis reaction.

At all times during the hydrolysis reaction, the solution was maintained at a temperature between −1° and 0°C, by circulation of a coolant through a stainless steel tubular heat exchange coil immersed in the agitated hydrolysis reactor.

The antimonous oxide slurry exiting the hydrolysis reactor was heated with agitation to 25°C and filtered. The resulting wet cake of antimonous oxide was repulped in a 5.65 M ammonia solution for thirty minutes, filtered and washed. After drying at 110°C, the resulting 140 parts by weight of chloride free (0.01% by wgt.) was analysed to be photostable senarmontite. The yield was in excess of 99%.

EXAMPLE 2

The procedure of Example 1 was repeated, except that hydrolysis was carried out at a temperature of about 8°C and the rate of formation of antimonous oxide was 7.0 parts by weight per minute. The product formed was photostable senarmontite.

EXAMPLE 3

The procedure of Example 1 was repeated except that hydrolysis was carried out at a temperature of 14°C. Photostable senarmontite was formed at the rate of 8.5 parts by weight per minute.

EXAMPLE 4

The procedure of Example 1 was repeated except that hydrolysis was carried out at a temperature of 25°C. Photostable senarmontite was produced at a rate of 7.0 parts by weight per minute.

EXAMPLE 5

The antimony trichloride contained in an aqueous solution of 11.25 parts by weight antimony trichloride and 1.27 parts by weight water was hydrolyzed to antimonous oxide by the addition, over a period of 5 minutes, to an ammonia-ammonium chloride solution. Hydrolysis was carried out at a temperature below −3°C. The aqueous solution of antimony trichloride was added to 300 parts by weight of an ammonia-ammonium chloride solution which contained 0.6 mole of ammonium chloride and 0.111 mole of ammonia per 100 ml. $H_2O$. The pH of the final slurry was about 8.3 when measured at ambient temperature. The 1.9 weight percent slurry of antimonous oxide produced was filtered, washed and dried and found to be photostable.

What is claimed is:

1. A process for the production of senarmontite which comprises:
    a. reacting antimony trichloride with a base selected from the group consisting of alkali, alkaline earth metal and ammonium bases and mixtures thereof and water to hydrolyze the antimony trichloride to particulate cubic antimonous oxide in an aqueous chloride solution containing a chloride selected from the group consisting of alkali metal chlorides, alkaline earth metal chlorides, ammonium chloride and mixtures thereof, said aqueous chloride solution being maintained at a temperature from the freezing point of said solution to about 40°C and at a pH of from about 7 to about 10;

b. recovering the particulate cubic antimonous oxide from the aqueous chloride solution.

2. The process of claim 1 in which said aqueous chloride solution has a chloride concentration of at least about 1 molar.

3. The process of claim 1 in which said aqueous chloride solution contains ammonium chloride in a concentration of from about 1 to about 5.5 molar.

4. The process of claim 3 in which the ammonium chloride concentration in said aqueous chloride solution is from about 3 to about 5 molar.

5. The process of claim 1 in which the hydrolysis is carried out at a solution pH of from about 8 to about 9.

6. The process of claim 1 in which hydrolysis is carried out at a temperature of from about 0° to about 25°C.

7. The process of claim 3 in which the hydrolysis is carried out at a solution pH of from about 8 to about 9.

8. The process of claim 3 in which the hydrolysis is carried out at a temperature of from about 0° to about 25°C.

9. The process of claim 4 in which the hydrolysis is carried out at a solution pH of from about 8 to about 9.

10. The process of claim 4 in which the hydrolysis is carried out at a temperature of from about 0° to about 25°C.

11. A process for the production of senarmontite which comprises:
   a. combining an aqueous solution of antimony trichloride with an aqueous chloride solution containing a chloride selected from the group consisting of alkali metal chlorides, alkaline earth metal chlorides, ammonium chloride and mixtures thereof in a hydrolysis zone; and
   b. reacting the antimony trichloride in the hydrolysis zone with a base selected from the group consisting of alkali, alkaline earth metal and ammonium bases and mixtures thereof and water at a temperature from the freezing point of the combined solutions to about 40°C and at a combined solution pH of from about 7 to about 10 to hydrolyze antimony trichloride to particulate cubic antimonous oxide and form a resultant solution.

12. The process of claim 11 in which the chloride concentration of the combined solutions is at least about 1 molar.

13. The process of claim 11 in which the aqueous chloride solution contains ammonium chloride and the chloride concentration of the combined solutions is from about 1 to about 5.5 molar.

14. The process of claim 13 in which the chloride concentration of the combined solutions is from about 3 to about 5 molar.

15. The process of claim 11 in which hydrolysis is carried out as a net solution pH of from about 8 to about 9.

16. The process of claim 11 including the step of preparing the aqueous solution of antimony trichloride prior to combining said aqueous solution with the aqueous chloride solution.

17. The process of claim 11 including the steps of separating the particulate cubic antimonous oxide from the resultant aqueous base solution by filtration to form a wet cake of particulate cubic antimonous oxide; repulping the wet cake of particulate cubic antimonous oxide in the presence of a chloride diluting solution selected from the group consisting of water and an aqueous basic solution at pH below about 11, to remove in the chloride diluting solution chloride retained by the wet cake and separating the chloride diluting solution from the wet cake of cubic antimonous oxide.

18. The process of claim 11 in which hydrolysis is carried out at a temperature from about 0° to about 25°C.

19. The process of claim 12 in which hydrolysis is carried out at a net solution pH of from about 8 to about 9.

20. The process of claim 12 in which hydrolysis is carried out at a temperature from about 0° to about 25°C.

21. The process of claim 13 in which hydrolysis is carried out at a net solution pH of from 8 to about 9.

22. The process of claim 13 in which hydrolysis is carried out at a temperature from about 0° to about 25°C.

23. The process of claim 11 in which the residence time of the antimony trichloride in the hydrolysis zone ranges from about 10 to about 30 minutes.

24. The process of claim 11 in which the antimony trichloride is added as an aqueous solution containing a chloride selected from the group consisting of alkali metal chlorides, alkaline earth metal chlorides, ammonium chloride and mixtures thereof.

25. The process of claim 11 in which the base required for hydrolysis is added to the aqueous chloride solution following the addition of the aqueous solution of antimony trichloride.

26. The process of claim 11 in which the base required for the hydrolysis is added to the aqueous chloride solution with the addition of the aqueous solution of antimony trichloride.

27. The process of claim 11 in which the base is ammonia and is added to the aqueous chloride solution prior to the addition of the aqueous solution of antimony trichloride.

28. The process of claim 1 including the steps of recovering the particulate antimonous oxide as a wet cake by filtration, repulping the wet cake of particulate cubic antimonous oxide in the presence of a chloride diluting solution selected from the group consisting of water and an aqueous basic wash solution having a pH less than about 11, to remove chloride and the oxychlorides of antimony retained by the wet cake of particulate cubic antimonous oxide and separating the chloride diluting solution from the wet cake of cubic antimonous oxide.

29. The process of claim 1 in which reaction time is from about 10 to about 30 minutes.

* * * * *

UNITED STATES PATENT AND TRADEMARK OFFICE
CERTIFICATE OF CORRECTION

PATENT NO. : 3,917,793
DATED : November 4, 1975
INVENTOR(S) : John L. Shafer

It is certified that error appears in the above-identified patent and that said Letters Patent are hereby corrected as shown below:

Column 2, line 18, at the end of Equation (1), the arrow pointing straight down is missing. The equation should read as follows:

--2 $SbCl_3$ + $6NH_3$ + $3H_2O \longrightarrow 6NH_4Cl$ + 2 $Sb_2O_3 \downarrow$    (1) --

Column 7, line 5, after "and" insert --while maintaining said solution--.

Column 7, line 47, after "40°C" delete "and at a" and insert --while maintaining the--.

Column 7, line 62, after "out" delete "as" and insert --at--.

Signed and Sealed this twentieth Day of April 1976

[SEAL]

Attest:

RUTH C. MASON
Attesting Officer

C. MARSHALL DANN
Commissioner of Patents and Trademarks